(12) United States Patent
Jenkins et al.

(10) Patent No.: US 8,494,336 B2
(45) Date of Patent: Jul. 23, 2013

(54) VARIABLE OPTICAL ATTENUATOR COMPRISING HOLLOW CORE WAVEGUIDE

(75) Inventors: Richard M Jenkins, Worcestershire (GB); Mark E McNie, Worcestershire (GB); David J Combes, Worcestershire (GB); James McQuillan, Worcestershire (GB)

(73) Assignee: Qinetiq Limited, London (GB)

( * ) Notice: Subject to any disclaimer, the term of this patent is extended or adjusted under 35 U.S.C. 154(b) by 1331 days.

(21) Appl. No.: 10/547,481

(22) PCT Filed: Mar. 12, 2004

(86) PCT No.: PCT/GB2004/001075
§ 371 (c)(1),
(2), (4) Date: Sep. 30, 2005

(87) PCT Pub. No.: WO2004/083915
PCT Pub. Date: Sep. 30, 2004

(65) Prior Publication Data
US 2006/0104592 A1 May 18, 2006

(30) Foreign Application Priority Data
Mar. 15, 2003 (GB) .................................. 0306008.4

(51) Int. Cl.
*G02B 6/00* (2006.01)
*G02B 6/26* (2006.01)

(52) U.S. Cl.
USPC .................. 385/140; 385/16; 385/18; 385/47; 385/125

(58) Field of Classification Search
USPC .................. 385/140, 16, 18, 19, 28, 47, 49, 5
See application file for complete search history.

(56) References Cited

U.S. PATENT DOCUMENTS

| 4,068,920 A | 1/1978 | Bass et al. |
| 4,453,803 A | 6/1984 | Hidaka et al. |

(Continued)

FOREIGN PATENT DOCUMENTS

| DE | 0 043 475 | 1/1982 |
| DE | 35 42 614 | 6/1987 |

(Continued)

OTHER PUBLICATIONS

International Search Report for PCT/GB2004/001075 dated Jun. 30, 2004.

(Continued)

*Primary Examiner* — Hemang Sanghavi
(74) *Attorney, Agent, or Firm* — Nixon & Vanderhye P.C.

(57) ABSTRACT

A variable optical attenuator device is described that comprises a first optical input, a first optical output, a first optical path between the first optical input and the first optical output, and means for moving a shutter across said first optical path. A hollow core waveguide is provided to substantially guide light along the first optical path of the device. The device may also be used to provide an analogue beam splitting or switch function in telecommunication systems and the like.

10 Claims, 3 Drawing Sheets

U.S. PATENT DOCUMENTS

| | | | |
|---|---|---|---|
| 5,428,698 | A | 6/1995 | Jenkins et al. |
| 6,002,514 | A | 12/1999 | Barrett et al. |
| 6,163,643 | A | 12/2000 | Bergmann et al. |
| 6,219,470 | B1 | 4/2001 | Tu |
| 6,315,462 | B1 | 11/2001 | Anthamatten et al. |
| 6,501,869 | B1 | 12/2002 | Athale |
| 6,740,537 | B2 * | 5/2004 | Helin .......................... 438/31 |
| 2002/0102059 | A1 | 8/2002 | Cho et al. |
| 2002/0191907 | A1 | 12/2002 | Ido et al. |
| 2003/0027370 | A1 | 2/2003 | Helin |
| 2003/0035613 | A1 | 2/2003 | Huber et al. |

FOREIGN PATENT DOCUMENTS

| | | |
|---|---|---|
| DE | 19609567 C1 * | 7/1997 |
| EP | 0 128 800 | 12/1984 |
| EP | 0 221 288 | 5/1987 |
| EP | 0718657 | 6/1996 |
| GB | 2 014 752 | 8/1979 |
| GB | 2 189 621 | 10/1987 |
| GB | 2 193 816 | 2/1988 |
| JP | 030025815 | 2/1991 |
| WO | 01/38921 | 7/2000 |
| WO | 01/59492 | 10/2000 |
| WO | 00/75503 | 12/2000 |
| WO | WO 01/86825 | 11/2001 |
| WO | WO 02/31551 | 4/2002 |
| WO | WO 03/065091 | 8/2003 |

OTHER PUBLICATIONS

GB Search Report for GB 0306008.4 dated Jul. 9, 2003.

Li et al., *Advanced fiber optical switches using deep RIE (DRIE) fabrication*, Sensors and Actuators A, 2003, vol. 102, No. 3, pp. 286-295, XP-004399072.

Miura et al., *Modeling and Fabrication of Hollow Optical Waveguide for Photonic Integrated Circuits*, Japanese Journal of Applied Physics, vol. 41, No. 7B, part 1, Jul. 2002, pp. 4785-4789.

Patent Abstracts of Japan, vol. 21, No. 21, Oct. 12, 1978, JP 53 087746 A, Aug. 2, 1978.

Miura et al., "Hollow Optical Waveguide for Temperature-Insensitive Photonic Integrated Circuits", Japanese Journal of Applied Physics, Publication Office Japanese Journal of Applied Physics, vol. 40, No. 7A, Part 2, Jul. 1, 2001, pp. L688-L690, XP001077922.

Wood et al., "MEMS 2D Matrix Switch", 2002, Mar. 17, 2002, pp. 91-92, vol. 1, XP002286382.

Takahashi et al., "Transmission Characteristics of Arrayed Waveguide N x N Wavelength Multiplexer", Journal of Lightwave Technology, IEEE, vol. 13, No. 3, Mar. 1, 1995, pp. 447-455, XP000509310.

Jenkins et al., "An Integrated Optic Approach to 10/spl mu/m LIDAR", Conference on Lasers and Electro-optics in Europe, Sep. 14, 1998, pp. 389-389, XP010617541.

* cited by examiner

Fig. 3.
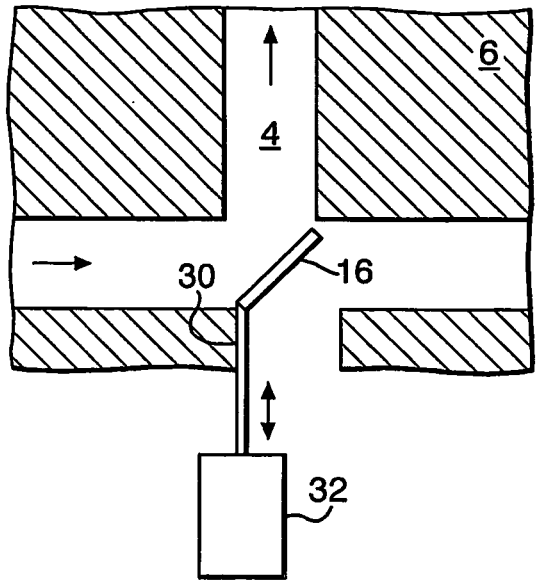
Fig. 4a.    Fig. 4b.    Fig. 4c.    Fig. 4d.
            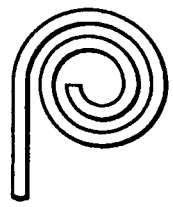
End    Short Taper    Long Taper    Spiral
Fig. 4e.    Fig. 4f.    Fig. 4g.
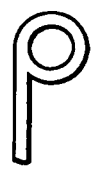        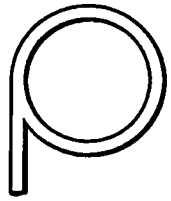
Circle 1    Circle 2    Circle 3

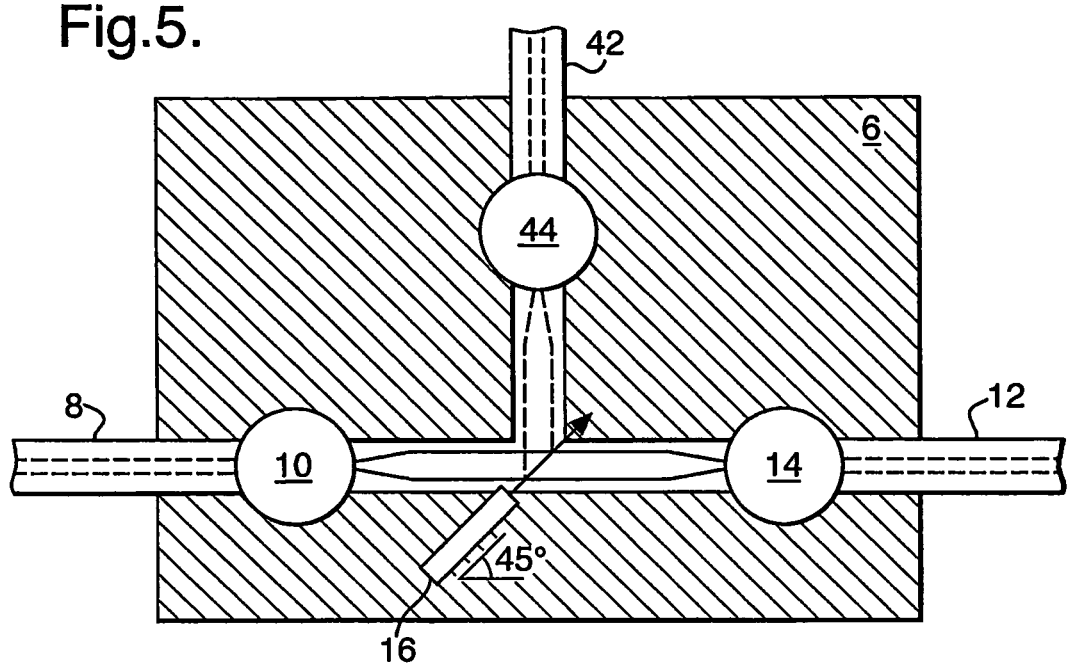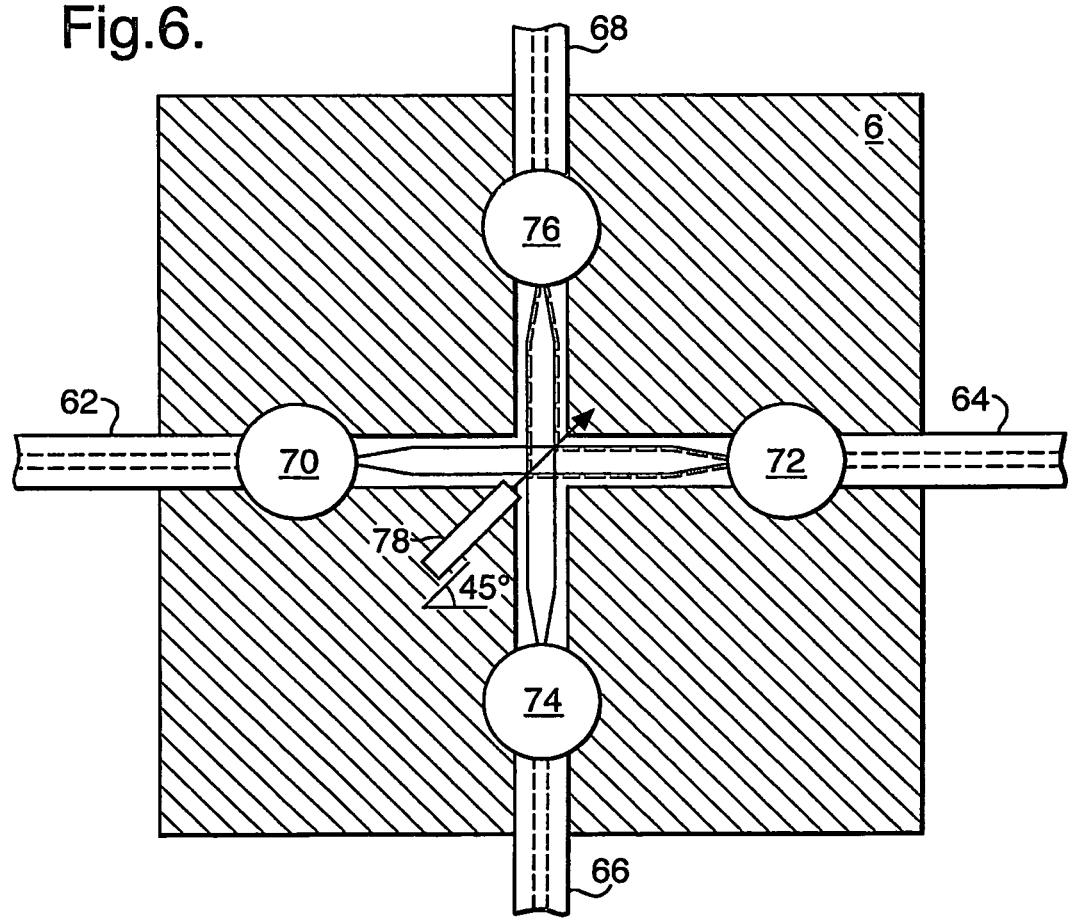

VARIABLE OPTICAL ATTENUATOR COMPRISING HOLLOW CORE WAVEGUIDE

This application is the U.S. national phase of international application PCT/GB2004/001075 filed 12 Mar. 2004 which designated the U.S. and claims benefit of GB 0306008.4 filed 15 Mar. 2003, the entire contents of each of which are hereby incorporated by reference.

This invention relates to a variable optical attenuator (VOA) device, and more particularly to such a device incorporating a micro-electro-mechanical system (MEMS) activated shutter.

Telecommunication and data networks are increasingly being implemented using optical components. To enable the power of an optical beam to be reduced in a controlled manner various types of variable optical attenuator (VOA) have been developed. In particular, VOAs are used as a convenient way of providing power equalisation in optical fibre networks and the like.

U.S. Pat. No. 6,163,643 and WO 01/75503 describe VOA devices in which light is coupled from an input waveguide to an output waveguide via an optical path that includes a region in which the beam propagates through free space. A beam occluding shutter is located adjacent the free space gap and linear movement of the shutter into, and out of, the path of the beam provides controllable beam attenuation. VOAs comprising u-shaped free space optical pathways that operate on the same principle are also known; for example see EP718657.

A disadvantage of free space VOAs, such as those described above, are the relatively high optical losses associated with the inclusion of the free space region in which the shutter is located. In particular, diffraction effects result in an increase of the beam diameter as it propagates through the free space gap. This can reduce the efficiency with which light is subsequently coupled into an output optical fibre. Angular misalignment of the shutter may also increase polarisation and/or wavelength dependent losses imparted to the beam by the device.

It is also known to form a VOA by locating a MEMS shutter in a free space region between two co-axially aligned optical fibres. For example, US2003/027370 describes a VOA in which propagation guides or channels are formed in a silicon substrate to house optical fibres. Input and output optical fibres are held in co-axial alignment in the propagation guides and a MEMS shutter is used to control the amount of light coupled between the input and output fibres. A similar arrangement is also described in U.S. Pat. No. 6,315,462. Furthermore, US2002/102059 teaches how a slight axial offset between input and output fibres can be used to reduce unwanted optical back reflections. Optical fibre based VOAs of this type typically involve quite complex designs in order to ensure accurate fibre alignment whilst minimising the free space gap between the optical fibre end facets.

WO 01/38921 and WO 01/59492 describe various VOA arrangements in which light is coupled between input and output optical fibres via buried solid core optical waveguides that are formed in a semiconductor substrate. A "trench" is formed across the solid core optical waveguide thereby defining input and output portions of the solid core waveguide. A MEMS moveable shutter is located in the trench and controls how much light is coupled between the input and output solid core waveguide portions. A disadvantage of this arrangement is the high number of air to solid waveguide interfaces which have a detrimental effect on device performance.

It is an object of the invention to mitigate at least some of the disadvantages described above.

According to the present invention, a variable optical attenuator device comprises a first optical input, a first optical output, a first optical path between the first optical input and the first optical output, and means for moving a shutter across (e.g. into and out of) said first optical path, wherein a hollow core waveguide is provided to substantially guide light along the first optical path. The device may be a standalone component, or may form part of a planar light circuit (PLC) of the type described in PCT patent application GB2003/000331.

A VOA of the present invention thus comprises hollow core optical waveguide to couple light between a first optical input and a first optical output via the shutter. In other words, light is guided from the first optical input to the shutter by a first section of hollow core optical waveguide and any light which passes the shutter is guided to the first optical output by a second section of hollow core optical waveguide. A device of the present invention is advantageous over prior art devices having a free space gap because guiding light to, and from, the shutter within hollow core waveguide reduces unwanted beam attenuation from free-space dispersion. The device is especially advantageous when used with small diameter beams where dispersion effects are proportionally greater. In addition, the use of hollow core waveguide in accordance with the invention removes the need to accurately position fibre ends in very close proximity as described in US 2003/027370 and does not introduce any additional air-to-solid waveguide interfaces as described in WO 01/38921 and WO 01/59492.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material. Furthermore, the terms "light" and "optical" are used herein to refer to any electromagnetic radiation having a wavelength from the deep ultraviolet to the far infra-red. As would be apparent to a person skilled in the art, a waveguide means a structure that confines and guides light.

The shutter provided to occlude the light beam passing along the first optical path may be shaped to provide the required optical function. Numerous shutter shapes are known to those skilled in the art; for example v-shaped shutters or jagged shutter designs of the type described in WO 01/75503.

The shutter may be arranged to be moveable across the whole, or just part, of the hollow core waveguide forming the first optical path. Alternatively, the shutter may be arranged to be moveable between first and second positions within the first optical path. The extent of shutter penetration into the optical path, and the amount of shutter movement provided, is selected to produce the required degree of beam attenuation control. It would be appreciated that the accuracy with which the shutter can be moved will control the accuracy of beam attenuation control. It should also be noted that the shutter could be arranged to move between two or more fixed positions (e.g. fully inserted and fully retracted positions) to provide two levels of attenuation (e.g. full and zero attenuation).

Advantageously, the device is formed in a substrate that comprises semiconductor material.

Semiconductor substrates, such as Silicon, can be etched to provide hollow core waveguides with high accuracy using micro-fabrication techniques. The substrate may advantageously comprise a multiple layer wafer; for example SiGe or silicon-on-insulator (SOI) or silicon-on-glass. A person skilled in the art would recognise that micro-fabrication techniques typically involve a lithography step to define a pattern, followed by an etch step to transform the pattern in to one or more layers on, or in, the substrate material. The lithography step may comprise photolithography, x-ray or e-beam lithography. The etch step may be performed using ion beam milling, a chemical etch, a dry plasma etch or a deep dry etch (also termed deep silicon etch). Micro-fabrication techniques of this type are also compatible with various layer deposition techniques such as sputtering, CVD and electro-plating.

Although substrates that comprise semiconductor material can advantageously be used, the device could also be formed on a variety of alternative substrate. For example, quartz, silica or glass substrates could be used. However, it is preferable to use substrates to which semiconductor processing techniques can be applied.

Preferably the device is formed in an silicon-on-insulator (SOI) wafer. It should be noted that in the case of certain semiconductor materials (including silicon) light may be input and/or output by the VOA in a direction parallel or normal (i.e. through wafer) to the plane defining the surface of the wafer.

Conveniently, a base portion and a lid portion are provided to form said hollow core waveguide structure. Such an arrangement provides a convenient means of producing the hollow core waveguide and is described in more detail in PCT patent application GB2003/000331. The lid portion or the base portion may comprise the means for moving the shutter across the hollow core waveguide.

Advantageously, the device is formed by micro-fabrication techniques such as deep reactive ion etching.

Conveniently, the means for moving a shutter across said first optical path comprises a micro-electro-mechanical system (MEMS) component. The choice of MEMS component would depend on the speed and amount of shutter movement required. The shutter may be formed as an integral part of the MEMS component, or may be attached to a MEMS actuation and/or displacement component.

Herein, MEMS is taken to include micro-machined elements, micro-systems technology, micro-robotics and micro-engineering and the like. The MEMS component may advantageously comprise an electro-thermal actuation mechanism to provide large throw (e.g. 5-100 µm full scale deflection) actuation. The MEMS component may also comprise a compliant mechanism to amplify deflection mechanically. Alternative actuation mechanisms such as electrostatic, electromagnetic, bimorph or piezoelectric may also be used.

Advantageously, the MEMS component is formed monolithically with the hollow core waveguide. In this manner, the MEMS component (which may include the shutter) is formed in the same process as the hollow core waveguide thereby providing a simple way to produce a VOA without requiring additional processing or device assembly. Alternatively, MEMS components (which may include the shutter) could be formed in a separate process and hybrid attached to the substrate in which the hollow core waveguide is formed.

Partly retaining the shutter within an alignment slot is advantageous as it provides accurate alignment of the shutter as it moves across the hollow core waveguide. This is particularly the case for hybrid devices. The alignment slot in which the shutter is located may be formed simultaneously with the formation of the hollow core waveguide. In this manner, the shutter can be arranged to tightly fit within the alignment slot whilst still being free to move into, and out of, the first optical path. For example, the alignment slot may be arranged to leave a 2 µm gap either side of each face of the shutter. This represents a low fraction of the overall hollow core waveguide cross-section (which is typically 10-200 µm) and thus ensures that light is substantially guided past the shutter; i.e. mode confinement within the hollow core waveguide is not significantly reduced by the small gap.

Advantageously, the device additionally comprises a second optical output. The second optical output is preferably arranged to receive light reflected by the shutter when located in the first optical path.

In other words, light reflected from the shutter when it is inserted (partially or fully) into the first optical path may be directed to a second optical output. The optical path between the shutter and the second optical output may also comprise hollow core optical waveguide. The provision of the second optical output prevents stray light from affecting the performance of a VOA; for example by heating the shutter or from unwanted light scattering effects.

The second optical output may advantageously comprise a beam dump means. For example, a circular or spiral hollow core waveguide structure could be used to dispose of waste light. Alternatively, the provision of a second optical output would enable the device to operate as a two-way analogue switch or a two-way variable intensity beam splitter. The device may also operate as a digital switch; e.g. the shutter being moveable between fully retracted and fully inserted positions.

A second optical input may advantageously be provided that defines a second optical path between the second optical input and the second optical output, said shutter being moveable across said second optical path. In this manner, two different optical paths are provided. The shutter is moveable across each of the two optical paths. In this manner movement of a single shutter can vary the attenuation applied to the two different beams propagating along the first and second optical paths.

Advantageously, a hollow core waveguide is provided to substantially guide light along the second optical path. As described above in relation to the first optical path, the provision of hollow core waveguides to guide the light reduces the optical losses that would be found with free space propagation.

Conveniently the first optical output is arranged to receive light from the second optical input that is reflected by the shutter when located in the second optical path.

In a preferred embodiment, the propagation axes of said first and second optical paths are substantially orthogonal at a point of intersection and the shutter is angled at substantially 45° to the propagation axes of the first and second optical paths. In this manner, the device can operate as a double beam splitting device. Movement of the shutter controls the ratio of light directed to the first and second outputs from the first input and also the ratio of light directed to the first and second outputs from the second input.

Conveniently, at least one of the first optical input, the first optical output, the second optical input and the second optical output comprise a means for receiving an optical fibre. For example, the means for receiving an optical fibre may comprise an alignment slot formed in the device that is arranged to clamp an optical fibre in place thereby allowing optical connection to the VOA. In the case of solid core fibres, stepped optical fibre alignment slots may be provided to hold both the buffer layer and the cladding. The alignment of the core of a hollow core optical fibre with the hollow core waveguide of the VOA may also be achieved; for example by clamping the optical fibre cladding in a alignment slot. The use of hollow core optical fibres would be especially advantageous as the air core to air core connection would be free from any unwanted reflections.

To provide efficient coupling between the core of an optical fibre and a hollow core waveguide of the VOA, the cross-section of the hollow core waveguide should be appropriate for the cross-section of the optical fibre core. In the case of solid core fibres, leakage into the cladding means that the width of the mode carried by the fibre is actually greater than the core diameter, for example typically the 10 µm solid core of a single mode glass fibre has a total field width of around 14 µm diameter. If the mode width is different to that of the hollow core waveguide, lenses (e.g. ball or GRIN rod etc) can be used to expand or reduce the optical field to enable light to be coupled to/from fibres with a different size core to that of the hollow core waveguide of the PLC. Fibre ends of solid core fibres may be anti-reflection coated.

Lensed fibres may also be used which would negate the requirement for separate collimating means to coupled the light into the hollow core waveguides of the VOA.

Advantageously, the shutter is substantially reflective. The shutter may be formed from a suitably reflective material or may carry an appropriate reflective coating.

Conveniently, the reflective material carried on the shutter is a layer of metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 µm; this encompasses wavelengths within the important telecommunications band of 1400 nm to 1600 nm. Copper exhibits a refractive index less than unity over the wavelength range of 560 nm to 2200 nm, whilst silver has similar refractive index properties over a wavelength range of 320 nm to 2480 nm.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide even coverage. Plating techniques are especially advantageous as they permit batch (i.e. multi-substrate parallel) processing to be undertaken.

A skilled person would recognise that adhesion layers and/or barrier diffusion layers could be deposited on the shutter prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

The reflective coating may also be provided by an all-dielectric, or a metal-dielectric, stack. A person skilled in the art would recognise that the optical thickness of the dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted with a halide to produce a thin surface layer of silver halide.

In other words, the reflective coating may be provided by an all-dielectric, or a metal-dielectric, stack. A person skilled in the art would recognise that the optical thickness of the dielectric layer(s) gives the required interference effects and thus determines the reflective properties of the coating. The reflective properties of the coating may also be dependent, to some extent, on the properties of the material in which the hollow core waveguides are formed. Hence, the material from which the shutter is formed may also form a base layer, and be a part of, any such multiple layer dielectric stack.

Advantageously, portions of the one or more hollow core optical waveguides have a substantially rectangular (which herein shall include square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width increases polarisation dependent losses, but may be advantageous when the polarisation state of light propagating through the waveguide is known.

Although rectangular cross-section waveguides are convenient, many alternative waveguide shapes could be employed. For example, circular, elliptical or v-shaped waveguides could be provided.

The internal surface of the hollow core waveguide may conveniently comprise a reflective coating. The reflective coating applied to the internal surface of the hollow core waveguide may be a metal or a dielectric or metal-dielectric stack of the type described above. Any coating applied to the internal surface of the hollow core waveguide may be the same as, or different to, any coating applied to the shutter.

The hollow core waveguide may advantageously be dimensioned to support fundamental mode propagation.

Alternatively, the hollow core waveguide may conveniently be dimensioned to support multi-mode propagation and may advantageously provide a multi-mode re-imaging effect. The re-imaging effect, which is described in more detail below, provides a replication of the input field a certain distance from the injection of the field into the multi-mode waveguide. Moving the shutter across the optical path in the vicinity of a multi-mode re-imaging point or a multi-mode replication point provides a convenient means of attenuating the optical beam. In particular, the re-imaging effect can be used to provide a re-imaging point close to the edge of the waveguide in the vicinity of the shutter. The shutter reach necessary to occlude the beam is thus reduced, simplifying construction and operation of the device.

Conveniently, the multi-mode wave guide is tapered so as to have reduced cross-sectional dimensions in the vicinity of the multi-mode re-imaging point. This further reduces the physical dimensions of the re-imaged beam thereby reducing further the amount of shutter movement required to produce a certain level of beam attenuation.

Alternatively, the shutter may move across the optical path in the vicinity of a point of maximum field expansion. This is advantageous where greater accuracy of attenuation is required.

Instead of using the re-imaging effect, the light may be collimated for propagation though the first and/or second optical paths by one or more collimating means such as GRIN rod, ball or Fresnel lenses. The collimating means may focus down a collimated beam that has propagated through the first and/or second optical paths to enable it to be coupled into an associated optical fibre. The use of a device comprising collimating means enables more flexibility over the separation of an optical input and its associated optical output than would be possible with a system base on the re-imaging effect. However, full attenuation requires a shutter that can substantially block the whole of the hollow waveguide channel. The skilled person would appreciate the different circumstances in which the two types of propagation through the device could be advantageously employed.

The invention will now be described, by way of example only, with reference to the following drawings in which;

FIG. 3 shows a shutter arrangement suitable for use in the devices described with reference to FIGS. 1 and 2;

FIG. 4 shows a number of hollow core beam dump designs for use in a VOA device of the present invention;

FIG. 5 shows a VOA according to the present invention providing a one-by-two optical switch function; and FIG. 6 shows a VOA according to the present invention providing a two-by-two optical switch function.

Figure 1:
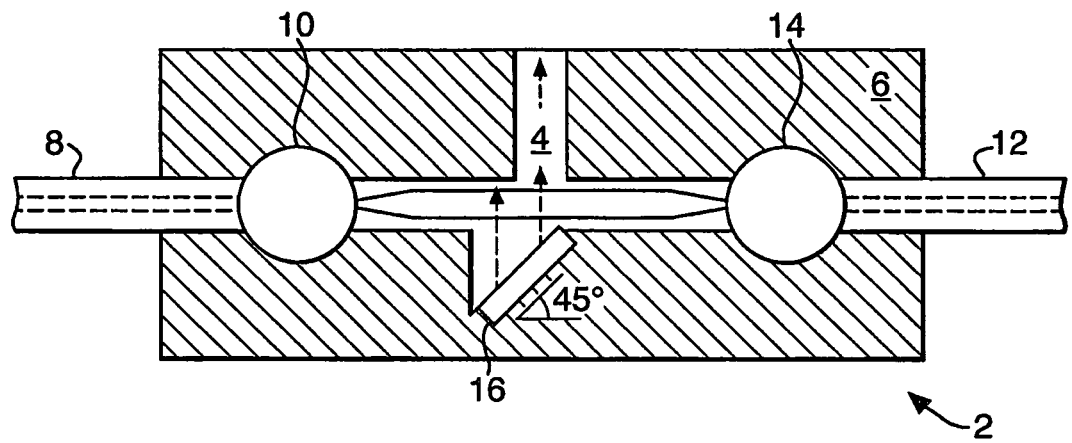
FIG. 1 shows a VOA according to the present invention.

Referring to FIG. 1, a VOA 2 according to the present invention is shown.

The VOA 2 comprises a T-shaped hollow core optical waveguide structure 4 formed in a silicon-on-insulator (SOI) substrate 6. The hollow core waveguides forming the structure are dimensioned so as to support fundamental mode propagation. Light is coupled into a first arm of the hollow waveguide structure 4 from an input optical fibre 8 via an input ball lens 10. Light is output from a second arm of the hollow waveguide structure 4 to an output optical fibre 12 via an output ball lens 14. The input and output ball lenses are provided to mode match between the optical fibres and the hollow core waveguide.

In the region of the T-junction, a MEMS moveable shutter 16 is provided in an alignment slot (not shown). The shutter in angled at 45° such that movement of the shutter 16 into the hollow core waveguide blocks the amount of light that is propagating from the first arm to second arm of the VOA device (i.e. from the input optical fibre 8 to the output optical fibre 12). Any waste light blocked by the shutter from entering the second arm of the T-junction is reflected through 90° and directed along the third arm of the T-shaped hollow core waveguide.

The shutter 16 is formed in the SOI substrate during fabrication of the hollow core waveguide and is thus monolithically integrated therewith. A lid (not shown) is subsequently attached to the SOI substrate to fully form the hollow core waveguide. The shutter 16 is typically arranged to be larger than the waveguide cross-section so that it can extend across the full width of the hollow core waveguide to enable maximum attenuation. As the shutter is defined at the same time as the hollow core waveguide it is self-aligned. In addition, the associated gap in the waveguide is relatively narrow on either side of the shutter (e.g. 2 μm on either side). This provides a low path length of unguided light (i.e. the beam is substantially guided) and hence low insertion loss as this represents a low fraction of the overall guide cross-section (typically 10-200 μm).

The silicon shutter does not quite extend all the way to the base of the guide (due to the sacrificial layer) or to the top of the guide (due to it being made in a slightly recessed portion of the silicon or offset by a metal spacer used in the lid attachment process). Hence, the shutter may move without touching another surface. The degree of optical attenuation achievable with such a shutter arrangement is still high as the mode confinement is such that there is little power near the edge of the guide, particularly near the corners.

In use, the location of the shutter 16 within the hollow core waveguide structure is varied in a controlled manner to provide the required attenuation to the input beam. In this way, a VOA is provided in which light is guided through the shutter region thereby minimising optical losses due to beam diffraction.

Figure 2:
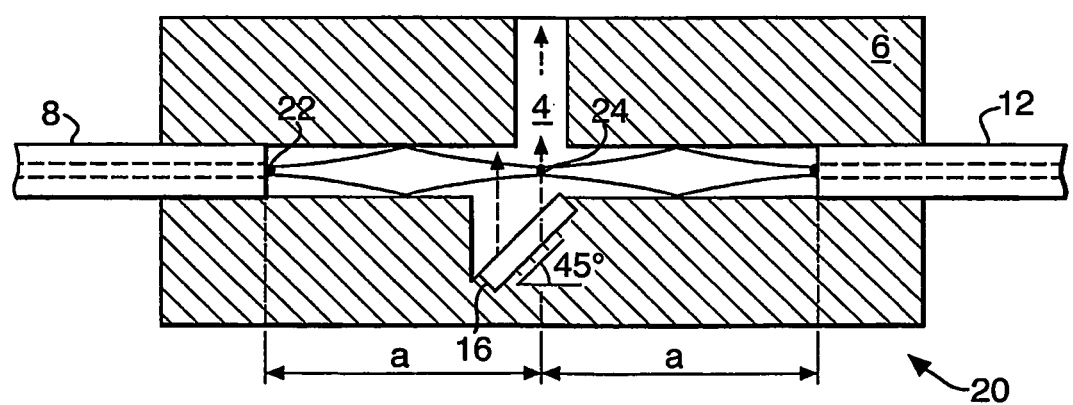
FIG. 2 show an alternative VOA according to the present invention.

Referring to FIG. 2, an alternative VOA 20 according to the present invention is shown. In common with the device described with reference to FIG. 1, the VOA 20 comprises a T-shaped hollow core optical waveguide structure 4 formed in a silicon substrate 6 and having an input optical fibre 8 and an output optical fibre 12. A MEMS moveable shutter 16 is also provided.

The VOA 20 does not however comprise ball lenses. The light from the input optical fibre 8 is coupled directly into the hollow core waveguide. The dimensions of the T-shaped hollow core optical waveguide structure 4 are arranged such that "re-imaging" of the input beam injected into the hollow core waveguide from the optical fibre 8 occurs in the vicinity of the MEMS moveable shutter 16.

The re-imaging phenomena is explained in more detail elsewhere; for example see PCT patent application GB2003/000331. In short, the hollow core optical waveguide structure to which the optical fibres are coupled may be formed so as to act as a multi-mode waveguide. Appropriately dimensioning the multi-mode waveguide produces various beam splitting and combining functions in which beams can be produced that are images of the input beam.

In particular, rectangular or square cross-section hollow multi-mode waveguides can be designed to provide re-imaging of symmetric, anti-symmetric or asymmetric optical fields by designing the length of the waveguide to have an appropriate relationship to its width and depth. In other words, the Gaussian input profile of a input beam is re-imaged (i.e. reproduced) after propagating a certain distance along a given waveguide. This effect also gives rise to beam replication; i.e. multiple images of the beam being formed a distances shorter than the re-imaging length. This effects is described previously in US5410625 and provides the basis for multi-mode interference (MMI) beam splitting devices.

As an example, a symmetric field in a square sectioned waveguide will have a re-imaging length is given by the square of the waveguide width over the wavelength of the propagating radiation. Re-imaging of the symmetric field occurs at the re-imaging length and multiples of the re-imaging length. Inbetween the re-imaging points, beam replication points and points of maximum field expansion are found.

For the case of a 50.0 μm wide hollow waveguide and 1.55 μm radiation, the re-imaging length is thus 1.613 mm. The symmetric field would be re-imaged at this length and also at integer multiples of this length, i.e. 3.23 mm, 4.84 mm etc. For example, a $TEM_{00}$ Gaussian input beam from a single mode optical fibre could be re-imaged at distances of 1.613 mm.

Alternatively, for the case of an asymmetric optical field, re-imaging occurs at eight times the length required for symmetric field re-imaging, i.e. at 12.09 mm for a 50.0 μm wide hollow waveguide. A mirror image of the asymmetric field is also formed at half this length i.e. at 6.05 mm. In particular, offsetting the input from the centre line of the multimode region provides an asymmetric input that is re-imaged at pre-determined distances along the guide at an equivalent offset on either side of the centre line. Thus a beam could be re-imaged close to the edge of the hollow core guide, thereby minimising the travel of the shutter required to occlude the beam.

In the case of a rectangular waveguide where the depth and width of the waveguide are substantially different, the re-imaging lengths associated with the two waveguide cross-sectional dimensions (e.g. depth and width) are themselves different. However, by arranging that the relationship between the dimensions of the rectangular hollow waveguide is such that re-imaging is produced at identical lengths for the particular width and depth, any field can be re-imaged. Thus, a symmetric field can be re-imaged in a hollow rectangular waveguide by arranging that the re-imaging lengths associated with axes of width $w_1$ and $w_2$ to be identical.

The distance "a" in FIG. 2 represents the re-imaging distance for a Gaussian light beam injected into the hollow core optical waveguide from the input optical fibre. It can be seen that an image of the light beam 22 injected into the hollow core optical waveguide by the input fibre 8 is provided in the re-imaging region 24. The re-imaged beam can thus be occluded by movement of the shutter 16 which is located in the vicinity of the re-imaging region 24. As the optical power of the beam is concentrated in the re-imaging region 24, the shutter movement required to switch between full and zero attenuation is reduced compared to that required in a device of the type described with reference to FIG. 1.

Referring to FIG. 3, the actuation mechanism 32 used to move the shutter 16 into, and out of, the hollow core waveguide 4 of devices described with reference to FIGS. 1 and 2 is illustrated. The shutter 16 is held on an arm portion 30 that is coupled to a MEMS actuation mechanism 32 formed slightly away from the hollow core waveguide structure 4.

The MEMS actuation mechanism 32 comprises an electrothermal MEMS actuation mechanism (e.g. a bent beam arrangement). Previously such mechanisms have been disclosed that can provide large throw (e.g. 5-100 μm full scale deflection) actuation. The shutter is in the plane of the wafer (i.e. vertical) and so may be relatively low footprint on the surface of the wafer.

Although electrothermal actuation mechanisms are described, alternative actuation mechanisms, such electrostatic, electromagnetic, bimorph, piezoelectric, etc, may be employed. In particular, an electrostatic comb drive could be used to provide the desired movement. The shutter could be also formed as a "flip-up" structure; this would allow shutter shape to be more accurately defined. More detail on MEMS device actuation technologies and the associated fabrication techniques can be found in "Fundamental of Microfabrication" by Marc Madou, published by CRC Press (Boca Raton) in 1997; ISBN 0-8493-9451-1.

The final thickness of the shutter will depend on the degree of shutter flatness required and the device power handling capability. A low scalloping, highly vertical deep dry etch process is suitable for attaining such a structure. After fabrication, the shutter can be coated on both sides during a waveguide coating process to provide high reflectivity. As described above, the coating is typically a metal, but dielectric stacks and metal-dielectric stacks may also be used. It would be appreciated by the skilled person that active areas of electrostatic drives or electrothermal drives may require passivation or masking prior to the coating process to maintain reliable device operation.

The "waste light" reflected from the shutter 16 in VOA devices of the type shown in FIGS. 1 and 2 can be transferred to a beam dump. This ensures the unwanted light does not increase noise or cause unwanted heating of a certain portion of the substrate.

Referring to FIG. 4, a number of suitable hollow core beam dump arrangements are shown. FIG. 4a shows a simple hollow core waveguide end, FIGS. 4b to 4c show tapered hollow core waveguide beam dumps, FIG. 4d shows a spiral beam dump whilst FIGS. 4e to 4g show various circular beam dumps. The spiral and circular beams dump (which may also be tapered) provide the highest levels of beam attenuation.

The skilled person would select the exact design of taper for the amount of optical power which is to be dumped by the device. Although the hollow core beam dumps can be used in VOAs, they can also be used in any other device in which optical power is to be dumped. In particular, such devices could form part of hollow core waveguide planar light circuits of the type described in PCT patent application GB2003/000331.

Referring to FIG. 5, a VOA 40 operable as a beam splitter or switch and based on the VOA described with reference to FIG. 1 is shown. Components of the VOA 40 similar to those described in FIG. 1 are assigned like reference numerals.

The VOA 40 comprises a T-shaped hollow core optical waveguide as described with reference to FIG. 1. However, any light reflected from the shutter 16 and directed along the third arm of the T-shaped hollow core waveguide is coupled into a second output optical fibre 42 via a second output ball lens 44.

In this manner, the VOA can operate as a beam splitting device or an optical switch. In other words, all or some of the light can be directed out of the optical path between the input fibre 8 and the output fibre 12 and to the second output fibre 42.

Referring to FIG. 6, a further alternative VOA 60 based on the device described with reference to FIG. 1 is shown.

The VOA 60 comprises a cross shaped hollow core optical waveguide structure. A first arm of the structure is linked to a first input optical fibre 62, a second arm of the structure is linked to a first output optical fibre 64, a third arm of the structure is linked to a second input optical fibre 66 and a fourth arm of the structure is linked to a second optical output fibre 68. Ball lenses 70, 72, 74 and 76 are provided to coupled light from the first, second, third and fourth arms to the first input optical fibre 62, the first output optical fibre 64, the second input optical fibre 66 and the second optical output fibre 68 respectively.

A reflective shutter 78 is insertable into the region of intersection of the hollow core optical waveguide arms. If the shutter 78 is fully retracted (i.e. fully removed from the hollow core optical waveguide) light from the first input optical fibre 62 passes through the first and second arms of the device and exits via the first output optical fibre 64. Similarly, light from the second input optical fibre 66 passes through the third and fourth arms of the device and exits via the second output optical fibre 68.

If the shutter 78 is fully inserted into the hollow waveguide structure, light from the first input optical fibre 62 passes through the first and fourth arms of the device and exits via the second output optical fibre 68. Light from the second input optical fibre 66 passes through the third and second arms of the device and exits via the first output optical fibre 64. In other words, full insertion of the shutter swaps the output fibre through which light from a given input exits the device. Partial insertion of the shutter 78 allows light from each input to be split between the two outputs (i.e. the device can operate as a two way analogue switch.

The invention claimed is:

1. A variable optical attenuator device comprising:
   a first optical input,
   a first optical output,
   a first optical path between the first optical input and the first optical output,
   a shutter that is moveable across said first optical path, wherein a hollow core waveguide is provided to substantially guide light along the first optical path, and
   a second optical output arranged to receive light reflected by said shutter when said shutter located in the first optical path, wherein said device is formed in a substrate that comprises semiconductor material, and wherein the second optical output comprises a beam dump means.

2. A variable optical attenuator device comprising:
a first optical input,
a first optical output,
a first optical path between the first optical input and the first optical output,
a shutter that is moveable across said first optical path, wherein a hollow core waveguide is provided to substantially guide light along the first optical path, and
a second optical output arranged to receive light reflected by said shutter when said shutter located in the first optical path, wherein said device is formed in a substrate that comprises semiconductor material, and wherein a second optical input is provided and a second optical path is defined between the second optical input and the second optical output, said shutter being moveable across said second optical path.

3. A device according to claim 2 wherein a hollow core waveguide is provided to substantially guide light along the second optical path.

4. A device according to claim 2 wherein the first optical output is arranged to receive light from the second optical input that is reflected by the shutter when located in the second optical path.

5. A device according to claim 2 wherein the propagation axes of said first and second optical paths are substantially orthogonal at a point of intersection and the shutter is angled at substantially 45° to the propagation axes of the first and second optical paths.

6. A device according to claim 2 wherein at least one of the second optical input and the second optical output comprise a means for receiving an optical fibre.

7. A variable optical attenuator device comprising a first optical input, a first optical output, a first optical path between the first optical input and the first optical output, and a shutter that is moveable across said first optical path, wherein a hollow core waveguide is provided to substantially guide light along the first optical path, wherein the hollow core waveguide is a multi-mode waveguide dimensioned to provide a multi-mode re-imaging effect.

8. A device according to claim 7 wherein the shutter is moveable across the first optical path in the vicinity of a multi-mode re-imaging or replication point.

9. A device according to claim 7 wherein the multi-mode wave guide is tapered so as to have reduced cross-sectional dimensions in the vicinity of the multi-mode re-imaging point.

10. A device according to claim 7 wherein the shutter is moveable across the first optical path in the vicinity of a point of maximum field expansion.

* * * * *